March 21, 1961     I. ANDERSON     2,976,424
PORTABLE WELDER GENERATOR
Filed Jan. 5, 1959     2 Sheets-Sheet 1
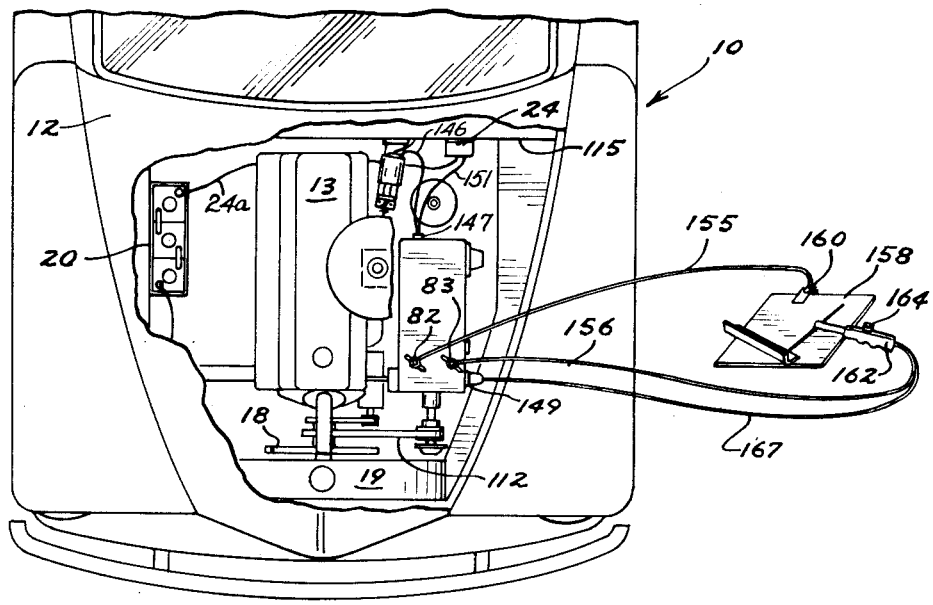
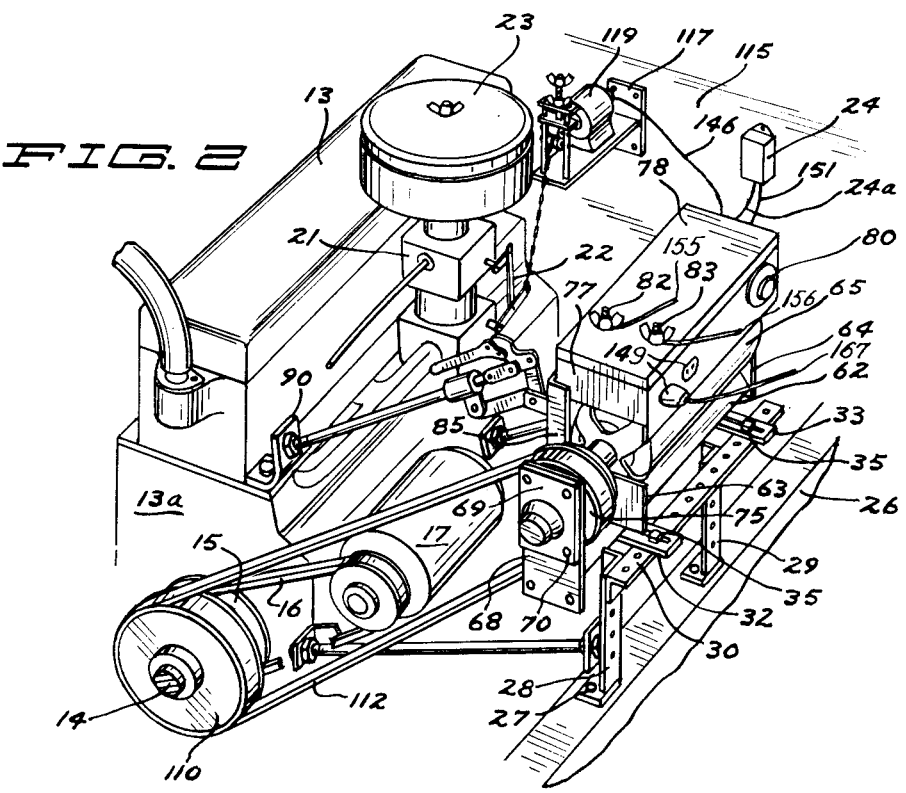

March 21, 1961 I. ANDERSON 2,976,424
PORTABLE WELDER GENERATOR
Filed Jan. 5, 1959 2 Sheets-Sheet 2

United States Patent Office 2,976,424
Patented Mar. 21, 1961

2,976,424

PORTABLE WELDER GENERATOR

Ivan Anderson, Braham, Minn., assignor, by mesne assignments, to W. W. Paulson & Co., Burley, Idaho Filed Jan. 5, 1959, Ser. No. 784,916

4 Claims. (Cl. 290—1)

This invention relates to an electric type of welder adapted for attachment within the hood portion of a motor vehicle.

Ordinarily when a welding repair is required, the part of thing to be repaired must be taken to a welding shop, or a welding rig must be ordered to come to the site where the repair is required. All of this involves expensive delay, such as with harvesting equipment becoming idle because of a broken part and where the element of time is extremely critical. It is desirable therefore to have a relatively inexpensive welder which can be mounted in a general all purpose vehicle, such as in a pick up truck, and have said welder operated by the motor of said vehicle. Such vehicles are commonly owned as by farmers and others who are in rather constant need of welding services. It is also desirable to have such a welder which when mounted in such a vehicle would not interfere with the normal use of said vehicle.

It is an object of this invention therefore to provide an electric welder mountable within the hood portion of a motor vehicle and adapted to be removably attached to the motor thereof for operation by said motor.

It is another object of this invention to provide a welder comprising a welding generator adapted to be mounted on the frame of a motor vehicle adjacent the motor in the hood portion thereof for operative connection with said motor.

It is a further object of this invention to provide a welder comprising a welding generator of such compact size that it can easily be mounted within the hood portion of a motor vehicle, but removably connected to the motor thereof and have remote control means for accelerating said motor for the operation of said generator.

It is a more specific object of this invention to provide an electric welder comprising a welding generator adapted to be carried on an adjustable bracket secured to the frame of a motor vehicle within the hood portion thereof in close proximity to the motor thereof and having a detachable operative connection with said motor, means for controlling the acceleration of said motor for the operation of said generator, and remote means for the control of said last mentioned means for the acceleration of said motor and operation of said generator during such periods of time as said generator is required for welding purposes.

These and other objects and advantages of the invention will be fully set forth in the following description made in connection with the accompanying drawings in which like reference characters refer to similar parts throughout the several views and in which:

Fig. 1 is a fragmentary view of a motor vehicle in perspective with a hood portion thereof broken away showing applicant's device in operating position on a somewhat reduced scale;

Fig. 2 is a view in perspective showing the applicant's device in operative association with the motor of a motor vehicle;

Figure 3:
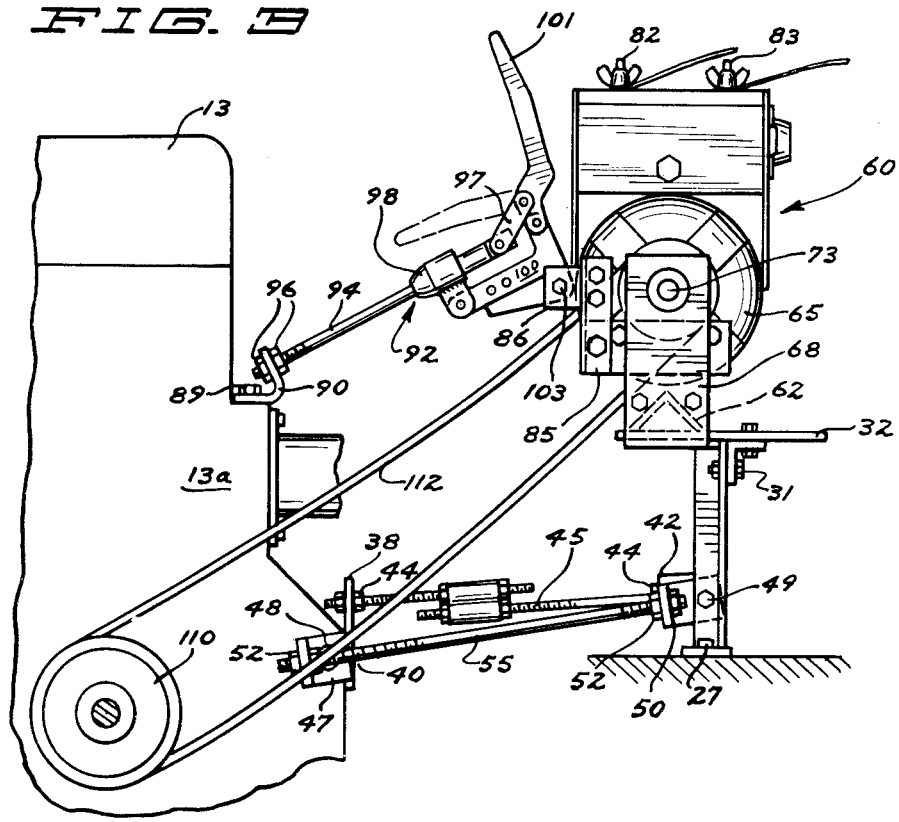
Fig. 3 is a view in front elevation of applicant's device with some parts thereof shown in dotted line and being shown in operative association with a broken away portion of a vehicle motor.
Figure 4:
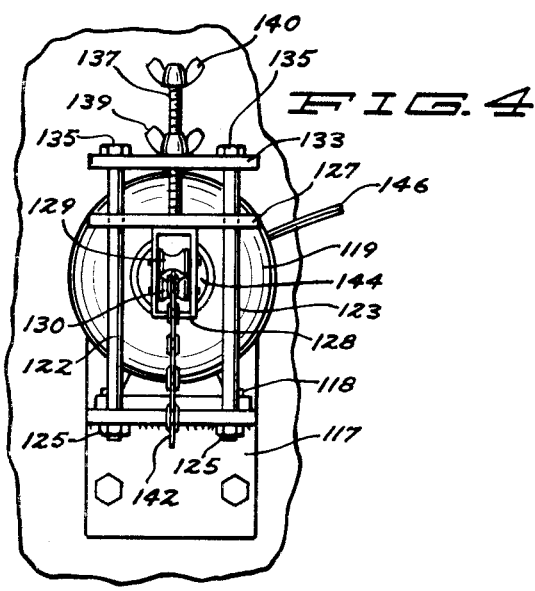
Fig. 4 is a view in front elevation of a portion of applicant's device on an enlarged scale.

Referring to the drawings in which like characters refer to identical parts throughout the several views, a front end portion of a motor vehicle chassis 10 is shown. Applicant's device is particularly adaptable for use in connection with a commercial vehicle, such as a pickup truck, which is in very common use particularly in rural areas. Said motor vehicle 10 is shown with a portion of its hood 12 broken away in Fig. 1 with the applicant's device being shown in operating position.

Only so much of said motor vehicle 10 is shown as is operatively connected to the applicant's device and some parts shown in close proximity thereto. Comprising said motor vehicle 10 is its motor 13 having a crank shaft 14 extending forwardly therefrom having a regular pulley 15 connected by a belt 16 to the starting generator dynamo 17. Also carried on said shaft is a fan 18 and positioned forwardly of said fan is a radiator 19. In connection with said motor is a carburetor 21 having accelerator linkage 22 mounted at one side thereof and having an air cleaner 23 carried thereabove. Mounted in the hood portion of said vehicle is a battery 20 providing a source of energy for the electrical system of said vehicle. With reference to Fig. 2, a battery connection 24 remote from said battery is shown with a line 24a connected to said battery.

A frame rail 26 of said motor vehicle will have secured thereto by bolts 27 longitudinally spaced upstanding L-shaped bracket members 28 and 29 having supporting plate-like bottom portions. Said bracket members form bracket legs. An L-shaped horizontal cross bar 30 is secured by bolts 31 to the upper portions of said legs. Said leg portions 28, 29 and said cross bar 30 have spaced perforations for variable adjustment. Said cross bar 30 is somewhat greater in length than the distance between said leg brackets 28 and 29 to provide substantial longitudinal adjustment. Longitudinally spaced on said cross bar 30 and mounted transversely thereof are slotted plate members 32 and 33 being secured to said member 30 by bolts 35.

Secured to the block of said motor 13 in alignment with bracket leg 29 is an apertured plate bracket 38 secured to said motor block by a bolt 40. Secured to said bracket leg 29 is an apertured L-shaped bracket 42. Extending between said brackets 38 and 42 and having its threaded ends adjustably secured to said brackets by nuts 44 is an adjustable stiffening rod 45. Secured to the motor block of said motor 13 in alignment with bracket leg 28 is an apertured L-shaped bracket 47 secured to said motor block by a bolt 48. Secured to said bracket leg 27 by a bolt 49 is an L-shaped apertured bracket 50 having its threaded ends respectively extending through said brackets, and being adjustably secured thereto by nuts 52 is a stiffening rod 55.

Mounted on said plate members 32 and 33 is a welding generator 60. Said generator comprises an inverted V-shaped base portion 62 having depending studs not here shown adapted to be disposed through the slots of said plates 32 and 33 and being secured thereto in any suitable manner, as by wing nuts. Said base member has longitudinally spaced upstanding walls 63 and 64 supporting therebetween an armature 65. Upstanding from the near end of said base member 62, as seen in Fig. 2, is a wall member 68 extending somewhat higher than said walls 63 and 64 and having a bearing plate 69 mounted thereon by bolts 70. Journaled in said bearing plate 69 is the extended end portion of armature shaft 73 of said armature 65, and secured onto said shaft inwardly of said wall 68 is a pulley 75.

Mounted on said armature is a casing 77 substantially rectangular in horizontal section having a removable lid 78 thereon. Said generator 60 has in connection therewith a rheostat 80 of well known and usual construction for adapting said generator for various types of welding. Extending upwardly through said lid 78 are terminals 82 and 83 equipped with wing nuts for securing cables thereon.

Upstanding from the edge of said wall 63 adjacent said motor 13 and rigid with said generator 60 is an L-shaped frame member 85 having a right-angled bracket 86 secured to an upper portion thereof with a flange of said bracket extending forwardly.

Secured to an upper portion of the block 13a of said motor 13 by a bolt 89 on the side adjacent said generator and in alignment with said bracket 86 is an angled bracket 90. Extending between said brackets 86 and 90 and secured thereto is a belt tightener 92. There is sufficient flexibility in the generator and its supporting bracket as a unit so that the upper portion thereof can be moved to some extent towards and away from said motor 13. This is the function of said belt tightener 92. Said belt tightener may be variously formed. In the embodiment of the invention here disclosed, said belt tightener comprises a rod 94 having a threaded lower end disposed through bracket 90 and secured thereto by nuts 96 at either side of said bracket.

Pivoted to the free end of said rod 94 is one end of a short link 97. Slidable on said rod 94 is a collar 98 having a depending apertured lug portion to which is pivoted the longer leg of a somewhat L-shaped link 100 having its shorter end pivoted to the end of an arcuate end-shaped portion of a handle 101. Said link 97 is pivoted at its free end to the central curvature of said arcuate portion, as shown in Fig. 3. Said handle has a substantial hand gripping portion for the exertion of leverage. Said L-shaped link is pivoted at its outer angled portion to bracket 86 by a pin 103. Said link 97 is so pivoted to handle 101 that when said handle is either in a raised position, as shown in Fig. 3, or in a lowered position, as shown in Fig. 2, it will be held locked in an off center relation in connection with said rod 94. When said handle 101 is raised, the resulting action of the link member 100 will be to slide the collar 98 forwardly on the rod 94 drawing the generator 60 and its supporting structure in a direction towards said motor 13. When said handle 101 is lowered to a locked position, as shown in Fig. 2, the resulting action of link 100 is to move collar 98 in a direction away from said motor 13, and said link 100 will be extended outwardly to move said generator 60 and its supporting structure in a direction away from said motor 13 whereby said belt 112 will be tightened.

Attached to said crank shaft 14 adjacent said fan 18 is a pulley 110. With reference to Fig. 2, the extended portion of said crank shaft 14 is indicated as being broken away. Said pulley will be adapted to fit various makes of crank shafts. Said generator 60 will be mounted on its bracket support to have the axis of armature shaft 73 parallel to the axis of the crank shaft 14 and to have pulley 75 in lateral alignment with said pulley 110. A belt 112 will pass over said pulleys 75 and 110.

Secured to the fire wall 115 of said motor vehicle 10 is a forwardly extending T bracket 117 directly behind said carburetor 21, and mounted thereon by bolts 118 is a solenoid 119. Said solenoid will be in alignment with said carburetor linkage 22. Carried at the front end of said solenoid on said bracket is a pair of upstanding guide rods 122 and 123 transversely of said bracket and having reduced lower ends disposed through said bracket and held secured by nuts 125.

Slidable on said guide rods 122 and 123 is a cross bar 127 having a rectangular frame 128 depending therefrom and having a pair of vertically spaced pulleys 129 and 130 journaled in said frame. Secured to the upper ends of said guide rods is a second cross bar 133 held in position by bolts 135. Threaded through said second cross bar 133 is a threaded bar 137 having its lower end journaled in said first cross bar 127 for supporting the same adjustably vertically of said guide rods. Said bar 137 is locked in position by a wing nut 139 and is rotatable manually by a wing-shaped handle 140 at its upper end.

A chain 142 at one end is connected to the core 144 of said solenoid and passes over one of said pulleys, and is here shown passing over pulley 130. The other end of said chain is connected to said accelerator linkage 22, as indicated in Fig. 2. Said solenoid is connected by a line 146 through a grommet 147 the generator 60 and said generator is connected to the battery connection member 24 by a line 151. The internal wiring of the generator is conventional. As is common in motor vehicles, the electrical system is grounded to the frame of the vehicle.

For use in connection with said generator 60 is a ground cable 155 adapted to be connected to the terminal 82, as indicated in Fig. 1, and said cable is shown connected to a work piece 158 by a ground clamp 160. A stinger or electrode cable 156 is provided adapted to be connected to said terminal 83 and having adjacent its free end a hand grip 162 having a manually operative switch 164 carried therein.

Connected to said switch 164 and adapted to be plugged into one of said receptacles 149 in a line 167 by means of which the operator controls said solenoid 119, energizing the same by depressing the extended button of said switch.

When in inoperative position, the belt 112 will be carried to one side of the generator 60 so as not to interfere with the normal operation of the motor 13. To install the belt 112 onto pulley 110, the handle 101 of the belt tightener 92 will be raised, drawing the generator towards said motor 13. There is sufficient slack here to easily slip said belt onto said pulley. The handle 101 is then moved downwardly to a locked position which tightens the belt 112.

The cables 155 and 156 will be connected to the terminals 82 and 83, and the line 167 will be plugged into one of the receptacles 149.

The motor of said vehicle 10 will be started, and let run in idling position. The ground clamp 160 will be secured to a work piece, and the operator will have the hand grip 162 in hand ready for welding. The operator depresses the button of switch 164 which energizes the solenoid 119 causing the core thereof to draw inwardly, pulling on the chain 142 and thus moving the accelerator linkage 22 to accelerating position. Said motor 13 through crank shaft 14 and pulley 110 will drive the belt 112 and the pulley 75 to operate the generator 60.

It has been found that to be suitable, the generator used should be capable of delivering a continuous output of 400 amps. with 200 amps. being required for a welding operation. Applicant's device as here described may be operated for as long a period of time as one hour continuously without overheating the motor of the vehicle. Applicant's welder as here indicated will deliver 200 amps. for welding purposes at a speed of 3600 r.p.m. Various degrees of heat as may be required can be secured by adjustment of the rheostat 80. It has been found for practical purposes that the chain 142 which is connected to the accelerator linkage should be adjusted to travel approximately three-eights of an inch for moving the accelerator linkage for operation of the generator 60.

Applicant's bracket construction permits the installation of applicant's welding device in various vehicles. The bracket itself, as is evident from its description, can be conveniently mounted on various frame structures, and the supporting bar 30 and the transverse plates 32 and 33 provide for a great deal of adjustment in the positioning of the generator 60.

Applicant thus provides a very compact welding device particularly adapted for mounting in the hood portion of a motor vehicle adjacent the motor thereof for a controlled operation from said motor. Applicant's device is relatively simple to install and has been found to be very efficient in operation under actual working conditions.

It will of course be understood that various changes may be made in the form, details, arrangements and proportions of the parts, without departing from the scope of applicant's invention, which, generally stated, consists of a device capable of carrying out the objects above set forth, in the parts and combinations of parts disclosed and defined in the appended claims.

What is claimed is:

1. An apparatus for controlling and a generating electrical energy in connection with a motor vehicle having in combination, a motor, the under hood frame portion of said motor vehicle adjacent one side of said motor, a bracket comprising a pair of frame members upstanding from said frame, a cross member supported on said upstanding members and a pair of spaced slotted plate members on said cross member constructed and arranged to be movable toward and away from said motor, a generator of relatively small compact size mounted on said plate members, a supporting member extending between said motor and said bracket for a rigid connection of said motor and bracket, said motor and said generator respectively having pulleys in alinement with one another, a belt passing over said pulleys, a manually adjustable connecting member between said motor and said generator for moving said generator toward and away from said motor for loosening and tightening said belt connection said pulleys, means connecting said motor and said generator constructed and arranged to accelerate and decelerate said motor in driving said generator, and remote means for operating said last mentioned means.

2. An apparatus for controlling and generating electrical energy in connection with a motor vehicle having in combination, a motor, the under hood frame portion of said motor vehicle adjacent one side of said motor, a bracket upstanding from said frame portion, plate supporting members on said bracket having adjustment toward and away from said motor, a generator of relatively small compact size supported on said plate members, an adjustable connecting rod extending between said motor and said bracket for forming an integral operating unit of said motor and said bracket and generator thereon, said motor and said generator having alined pulleys, a belt passing over said pulleys, a hand adjustable connecting member between said motor and said generator for moving said generator toward and away from said motor for the removal or placement of said belt, means in connection with said motor and generator for accelerating and decelerating said motor to drive said generator, an accelerator arm connected to said motor, said means having an adjustable linkage extending to said accelerator arm for determining the extent of the acceleration or deceleration of said motor, and remote means for actuating said first mentioned means.

3. An apparatus for controlling and generating electrical energy in connection with the under hood frame portion of a motor vehicle adjacent the motor thereof having in combination, a bracket mounted on said frame for adjustably supporting a generator adjacent said motor, a generator of relatively small compact size mounted on said bracket, the motor of said vehicle having a driving pulley, said generator having a pulley in alinement with said motor pulley, a belt passing over said pulleys, means for holding said generator rigid with said motor to form an integral operating unit of said motor and generator, a manually operable connecting means between said generator and said motor for moving said generator toward and away from said motor for loosening and tightening said belt, means for controlling the acceleration and deceleration of said motor in connection with said generator, an accelerator arm in connection with said motor, linkage connecting said means and the accelerator arm of said motor, means for adjusting said linkage to determine the extent of said acceleration and deceleration, and remote means for controlling said first mentioned means.

4. An apparatus for controlling and generating electrical energy in connection with the under hood frame portion of a motor vehicle adjacent the motor thereof having in combination, a bracket upstanding from said frame adjacent one side of said motor, a generator adjustably supported on said bracket, means connecting said bracket and said motor for forming an integral operating unit of said motor and said bracket with said generator thereon, said motor and said generator having alined pulleys, a belt passing over said pulleys, a hand adjustable connecting member extending between said generator and said motor for movement of said generator toward and away from said motor for removal and placement of said belt and for locking said generator in an operating position integral with said motor, means in connection with said motor and generator for accelerating and decelerating said motor to drive said generator, an accelerator arm in connection with said motor, a flexible linkage connecting said means and said accelerator arm of said motor, a pair of upstanding guide members mounted on said last mentioned means, a cross member slidable on said guide members, a pulley depending from said cross member, said flexible member moving over said pulley, manual means for adjusting the height of said cross member to adjust the effective length of said flexible member in controlling said accelerator arm of said motor, and remote means for operating said second mentioned means.

References Cited in the file of this patent

UNITED STATES PATENTS

| | | |
|---|---|---|
| 1,254,320 | Fitzgerald | Jan. 22, 1918 |
| 1,528,364 | Brown | Mar. 3, 1925 |
| 2,043,331 | Notvest | June 9, 1936 |
| 2,223,692 | Marec | Dec. 3, 1940 |
| 2,227,486 | Campbell | Jan. 7, 1941 |
| 2,310,081 | Hill | Feb. 2, 1943 |
| 2,508,756 | Jackoboice | May 23, 1950 |

FOREIGN PATENTS

| | | |
|---|---|---|
| 6,098 | Great Britain | of 1915 |